United States Patent [19]

Hieb

[11] Patent Number: 4,940,161

[45] Date of Patent: Jul. 10, 1990

[54] RAMP APPARATUS

[75] Inventor: Larry E. Hieb, Fresno, Calif.

[73] Assignee: The Vendo Company, Fresno, Calif.

[21] Appl. No.: 212,580

[22] Filed: Jun. 28, 1988

[51] Int. Cl.⁵ .............................................. B65G 59/00

[52] U.S. Cl. ...................................... 221/67; 221/194; 221/289

[58] Field of Search ................. 221/67, 118, 194, 289, 221/312

[56] References Cited

U.S. PATENT DOCUMENTS

| | | | |
|---|---|---|---|
| 1,149,377 | 8/1915 | Lovern | 221/194 |
| 2,511,099 | 6/1950 | Case | 221/312 |
| 3,104,779 | 9/1963 | Denzer | 221/312 |
| 3,341,068 | 9/1967 | Newberry | 221/67 |
| 3,776,417 | 12/1973 | Austin | 221/67 |
| 4,454,961 | 6/1984 | Childers et al. | 221/266 |
| 4,705,176 | 11/1987 | Oden | 221/176 X |
| 4,852,767 | 8/1989 | Humphrey | 221/67 |

*Primary Examiner*—H. Grant Skaggs
*Assistant Examiner*—Steve Rein
*Attorney, Agent, or Firm*—Worrel & Worrel

[57] ABSTRACT

A ramp apparatus for causing a plurality of containers disposed in a staggered stack column to converge into a single stack column for subsequent dispensing by a single column dispensing mechanism, the ramp apparatus having an upper edge of a configuration such as not to contact a substantial portion of a container passing thereover at any one time and a supporting surface operable to cause the containers to converge to form the single stack column in a minimum of vertical distance while simultaneously inhibiting the containers from bridging with adjoining containers.

11 Claims, 4 Drawing Sheets

RAMP APPARATUS

BACKGROUND OF THE INvENTION

1. Field of the Invention

The present invention relates to a ramp apparatus which is utilized in combination with a vending machine for selectively vending a plurality of containers, and more particularly to a ramp apparatus for causing containers in a vending machine having a staggered stack column to converge so as to permit the use of a single column dispensing mechanism, the ramp apparatus permitting the manufacturers of such vending machines to standardize the dispensing mechanisms utilized in such machines by eliminating dispensing mechanisms which are adapted to dispense containers from staggered stack columns and which further is relatively inexpensive to manufacture and maintain and which affords the optimum conditions for selectively dispensing vendables in a reliable and highly efficient manner while reducing the risk of product bridging to a minimum.

2. Description of the Prior Art

In the vending industry, and more particularly in that segment of the industry which manufactures vending machines that dispense soft drink containers and the like, assorted mechanical and electrical subassemblies have been developed and employed over the years with the focus of attention being directed towards the production of a vending machine which would dispense a larger number of varieties of soft drinks. The prior art is replete with numerous examples of vending machine designs which have been incorporated into a rather uniformly dimensioned housing to accomplish the aforementioned purpose.

As a general matter, the motivation behind the search for a vending machine which will dispense a larger number of varieties of soft drinks has been a desire to discover a means by which the space internally of the vending machine could be allocated or otherwise divided up based upon the numbers of sales of a selected variety of soft drink. This is most commonly referred to in the industry as an allocation of space based upon the sales to space ratio. If the space internally of the vending machine is strictly divided up based upon the sales to space ratio, a typical vending machine which is capable of vending up to six varieties of soft drinks would in reality only dispense two or perhaps three varieties, that is three or four of the available selections on the vending machine would be a single highly popular variety and the remainder of the selections would be varieties which are not so popular. In some cases, in an effort to satisfy customer demands for less popular varieties of soft drinks, vending machine owners have allocated more space to the less popular brands thus causing their respective vending machines to be less profitable than if they had alternatively allocated the available vending machine space based upon the space to sales ratio.

Attempts made in the prior art to address this problem of allocating the predetermined internal volume of a vending machine to increasing numbers of different varieties of soft drinks which have relatively low sales have assumed various forms. For instance, some manufacturers of vending machines employ a rather fixed staggered stack column arrangement in combination with single stack columns for the products which are vended, in an effort to achieve a more desirable space to sales ratio. In other instances, manufacturers of vending machines have developed elaborate adjustable channel assemblies which permit a large volume of the available vending space to be dedicated to one highly popular brand of soft drink, the highly popular brand being dispensed out of one or perhaps two of the available selections on the machine. The utilization of such devices and assemblies and in particular the use of a combined staggered stack, and single stack column arrangement, has caused the manufacturers of these particular vending machines to incorporate several uniquely different dispensing mechanisms in the same vending machine, the individual dispensing mechanisms operable to dispense containers from either the single stack or the staggered stack columns. It should be readily evident that the use of several different types of dispensing mechanisms within the same vending machine has the effect of causing such machines to become rather complicated, increasing the cost of manufacture and multiplying the assorted problems which relate to servicing and maintaining such mechanisms.

Other attempts in the prior art to address the problem of allocating the predetermined volume of a vending machine based on the space to sales ratio have included other more basic and obvious approaches, such as increasing the size of the available housing and employing assorted electronic devices to reduce the physical size of the previously employed mechanical subassemblies. While these assorted mechanical and electronic devices and design changes have operated with varying degrees of success, they are unsatisfactory in one or more respects. For example, some of these devices are relatively cumbersome to utilize, cannot be retrofitted on existing machines and are often expensive to manufacture. Others take exceedingly great amounts of time to set up or alternatively are in need of constant maintenance. Yet another more serious deficiency common among all the prior art devices and assemblies is that they generally do not maintain the maximum number of containers possible in the space which is allocated to that particular variety inside the housing of the dispensing machine. Still another problem with prior art vending machines is product bridging; that is, the positioning of two or more containers in such a way relative to each other that they will not move any further. This, of course, impedes dispensing from that column.

Therefore, it has long been known that it would be desirable to have an apparatus which would permit the predetermined space defined internally of a vending machine to be substantially allocated on the basis of a predetermined space to sales ratio and which further would be operable to reduce the number of different component elements utilized to dispense the containers stored therein while reducing the risk of product bridging.

SUMMARY OF THE INVENTION

Therefore, it is an object of the present invention to provide an improved ramp apparatus for use in vending machines and the like.

Another object is to provide such a ramp apparatus which is operable to cause a staggered stack column of containers to be merged into a single, next-to-be dispensed product row so as to permit the vending machine to mount a single product row dispensing mechanism for dispensing the containers from the staggered stack column.

Another object is to provide such a ramp apparatus which is operable substantially to inhibit the individual containers in the staggered stack column from bridging with adjoining containers while simultaneously maintaining the maximum number of containers possible in the staggered stack column.

Another object is to provide such a ramp apparatus which is operable to reduce the number of mechanisms and assemblies that are incorporated into a conventionally designed vending machine, the ramp apparatus having the attendant benefit of decreasing the number of different components used in the vending machine and thereby decreasing the cost of manufacturing the vending machines.

Another object is to provide such a ramp apparatus which is operable to treat a stream of containers, such as soft drink containers, rapidly, dependably, and efficiently, while reducing to an absolute minimum the possibility of malfunction.

Another object is to provide such a ramp apparatus which operates in combination with a conventional single column dispensing mechanism for purposes of further enhancing the speed and reliability with which a selected container can be selectively dispensed from the vending machine.

Another object is to provide such a ramp apparatus which permits the internal volume of a selected vending machine to be allocated to various varieties of product, such as various varieties of soft drink containers, based substantially upon a predetermined space to sales ratio.

Another object is to provide such a ramp apparatus which can readily be mounted on most models and designs of commercially available vending machines, and the associated staggered stack columns thereof, in the manner of a retrofit, or alternatively manufactured as a unitary subassembly.

Another object of the present invention is to provide such an apparatus which can readily be accessed for purposes of maintenance, modification, or the like.

Another object is to provide such a ramp apparatus which is operable to cause a staggered stack column of containers to merge in a minimum of vertical distance, the ramp apparatus operating without adjustment and substantially inhibiting jamming or bridging of the containers.

Another object is to provide such a ramp apparatus which is operable to dispense a plurality of containers from a single or multiple depth stack, and which further is adapted to handle containers having a variety of different diameters.

Another object is to provide such an apparatus which is of relatively nominal cost to manufacture and maintain and which has the attendant benefit of increasing the profitability of a vending machine so equipped.

Another object is to provide such an apparatus which is characterized by ease of employment, simplicity of construction, and which can be sold at a relatively nominal price.

Further objects and advantages are to provide improved elements and arrangements thereof in a ramp apparatus for the purposes described which are dependable, economical, durable, and fully effectivelY in accomplishing its intended purposes.

These and other objects and advantages are achieved in a ramp apparatus which, in the preferred embodiment, is disposed in close proximity and in feeding relation to a single column dispensing mechanism, the ramp apparatus operable to cause a staggered stack column of containers to converge into a single stack column in a minimum of vertical distance and having a supporting surface that is operable substantially to inhibit the containers from bridging with adjoining containers while simultaneously maintaining the maximum number of containers possible in the staggered stack column thereby allowing the allocation of space internally of the vending machine in a manner closely related to a predetermined space to sales ratio.

DESCRIPTION OF THE PREFERRED EMBODIMENT

Figure 6:
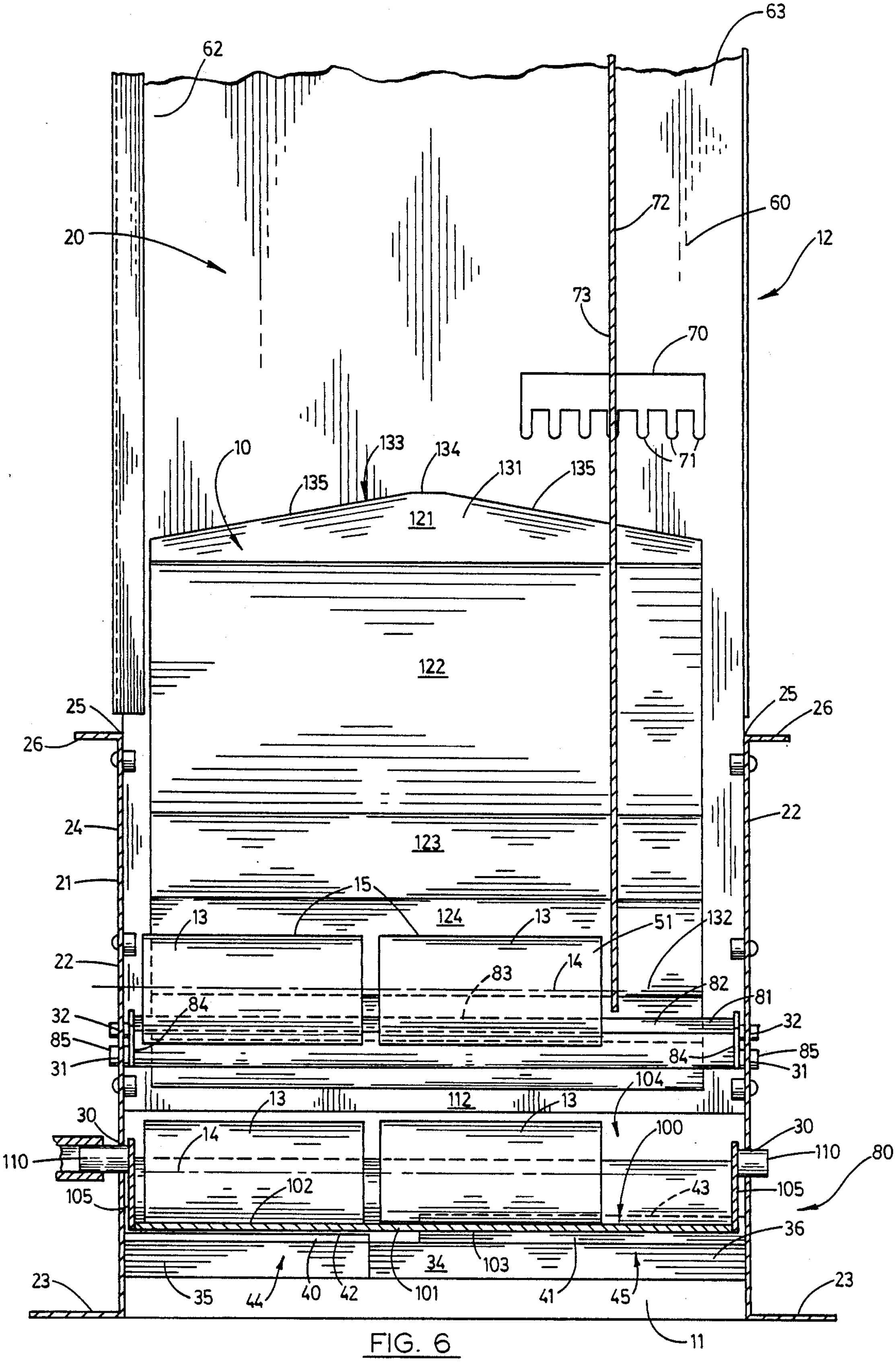
FIG. 6 is a fragmentary, longitudinal, vertical 1 section taken on line 6—6 of FIG. 1.

Referring more particularly to the drawings, the ramp apparatus of the present invention is generally indicated by the numeral 10 and is best shown in FIG. 6.

For illustrative convenience, the apparatus, as shown and described herein, is discussed as it would be configured if it were installed as an operable subassembly on a conventional vending machine 11. The vending machine has a plurality of vending columns 12, only one of which is shown in the drawings. Each vending column is operable to hold a plurality of products or containers 13 for subsequent selective vending therefrom. The products can be of a wide variety of types and shapes. Similarly, of course, the products housed in the containers can be of virtually any type. The products shown herein are depicted as substantially cylindrical soft drink containers or cans which have a predetermined diameter, radius and length Further, each of the containers has a longitudinal axis 14 and an exterior surface 15. Although the containers to be vended shown and described herein for illustrative convenience are substantially cylindrical metal containers, all containers described by a surface of revolution including cans having a relatively smaller diameter than the depicted containers and bottles of both glass and plastic construction which have tapered and enlarged portions can be employed with the vending apparatus of the present invention.

The vending machine 11 is representative of vending machines in general in which the containers are stored in a staggered stack column 20. The vending machine may have a plurality of both staggered stack columns and single stack columns, not shown. The assorted columns permit the internal storage space of the vending machine 11 to be allocated to particular varieties or brands of containers 13 based upon a predetermined space to sales ratio. The staggered stack column, which is generally indicated by the numeral 20, has first and second support members 21 and 22, respectively, which are mounted on the vending machine using welding or other fastening techniques and which are disposed in predetermined substantially parallel spaced relation one with the other. Each support member has a substantially horizontally disposed base portion 23 which is affixed on the vending machine in substantially facing relation and a substantially vertically disposed wall portion 24 which is affixed on the base portion and is disposed in a nearly normal attitude thereto. Each wall portion 24 has a top edge 25 extending outwardly at a nearly normal attitude therefrom. This is illustrated most clearly in FIG. 6.

First, second, and third orifices 30, 31 and 32, respectively, are formed in the first support member 21 and in the second support member 22. The corresponding first, second and third orifices of the respective support members are disposed in substantially identical positions in coaxial alignment. A discharge control member, generally indicated by the numeral 33, is borne by the staggered stack column 20 and is mounted on the first and second support members. The discharge control member, which is disposed in a substantially horizontal attitude, has a main body 34, and a first end 35, which is affixed on the first support member 21, and a second end 36, which is affixed on the second support member 22. The main body further has a reduced dimensioned first portion 40 and a second portion 41. The first and second portions define first and second longitudinally extending receiving edges 42 and 43, respectively. Further, the first and second portions define first and second discharge areas 44 and 45, respectively. The individual containers 13 pass through these respective areas during the dispensing cycle which will hereinafter be discussed in greater detail.

Figure 2:
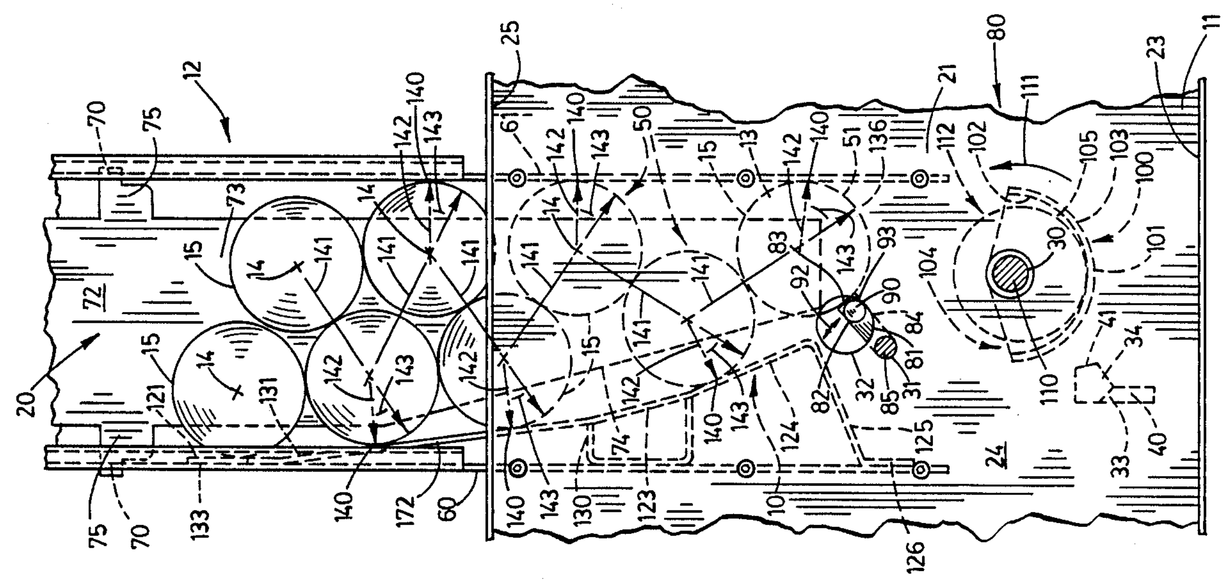
FIG. 2 is a fragmentary, transverse vertical section taken line 2—2 of FIG. 1 showing the operable portions thereof in a first stage of operation in a given cycle.
Figure 5:
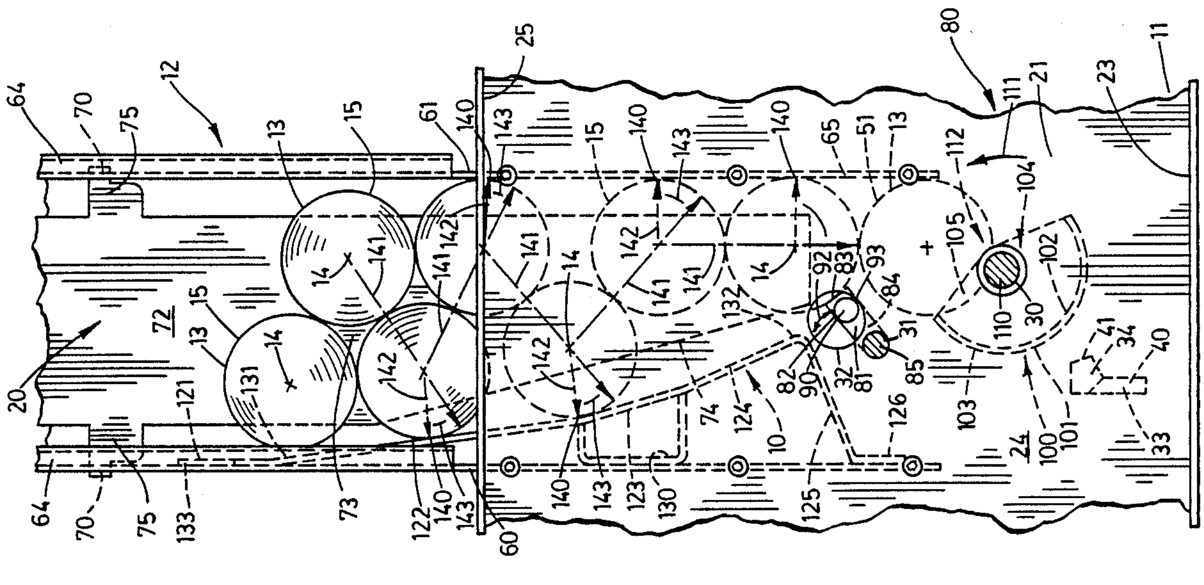
FIG. 5 is a fragmentary, transverse, vertical section also taken on line 2—2 of FIG. 1 showing the operable portions thereof in a fourth stage of operation in a given cycle.

As best shown in FIGS. 2 and 6, the staggered stack column 20 receives and is operable to hold a plurality of containers 13 which are disposed in tiers 50. The containers are juxtapositioned in end-to-end relation with their respective longitudinal axes 14 disposed in substantially coincident relation. The staggered stack column further has a lowermost, or next-to-be dispensed, tier 51 which is at a predetermined elevation and towards which the tiers 50 of containers 13 gravitate. As shown in FIG. 6, the length of the first and second edges 42 and 43 is approximately one-half the length of the main body 34 and is generally substantially equal in length to the length of- an individual container 13. The operation of the discharge control member 33 will hereinafter be discussed in greater detail.

A pair of walls, hereinafter referred to as first and second walls 60 and 61, are mounted on, and otherwise individually interconnect, the first and second support members 21 and 22, and are disposed in substantially parallel, fixed spaced relation, one with the other. Each wall has individual first and second ends 62 and 63 and each first end has a channeling surface 64 which is operable to direct the plurality of containers along the staggered stack column 20. Each wall further has a substantially rectangularly shaped opening 70 formed therein. The openings 70 are individually disposed in approximately the same attitudes and in substantially coaxial alignment one with the other. Further, a plurality of adjustment slots 71 are formed in each wall and extend downwardly from the rectangularly shaped openings at substantially normal attitudes. The plurality of slots are disposed in substantially equally spaced relation with each other.

An adjustable partition 72 is detachably mounted on each of the walls 60 and 61. Each partition, which is disposed in a substantially normal attitude with respect to the individual walls, is adapted slidably to be received in a selected adjustment slot 71 and thereby engage the respective walls. With the partition in place the staggered stack column 20 has a length dimension which is somewhat slightly greater than the length of the containers 13 which are positioned in juxtaposed relation as illustrated in FIG. 6. The partition can be slidably mounted in interfitted receipt in any of the plurality of adjustment slots thereby permitting the staggered stack column to vend cylindrically shaped containers of different lengths. The partition has a main body 73 which is defined by a peripheral edge 74 and support tabs 75 are mounted on the main body and are individually conformably dimensioned to engage the adjustment slots 71. This is illustrated in FIGS. 2 through 5.

A single column dispensing mechanism, which is generally indicated by the numeral 80, is borne by the vending machine 11 and is operable, using a control system not shown, selectively to vend individual containers 13 from the staggered stack column 20 in a multiple depth stack. The dispensing mechanism 80 operates in a manner similar to the dispensing mechanism disclosed in U.S. Pat. No. 4,454,961 to Childers, et al. and which relates to a "Package Dispensing Mechanism For Vending Machines": The ramp apparatus 10 of the instant invention, however, can operate in combination with a variety of types of single column dispensing mechanisms. Therefore, the ramp apparatus of the present invention is not limited to use with the single column dispensing mechanism described in U.S. Pat. No. 4,454,961.

Figure 3:
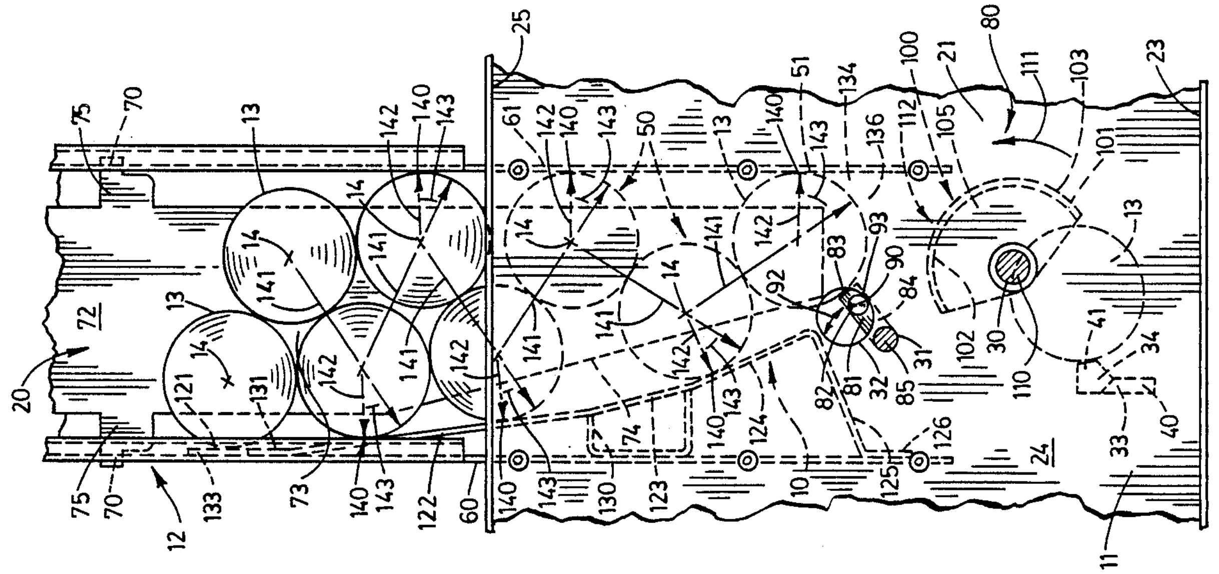
FIG. 3 is a fragmentary, transverse, vertical section also taken on line 2—2 of FIG. 1 showing the operable portions thereof in a second stage of operation in a given cycle.
Figure 4:
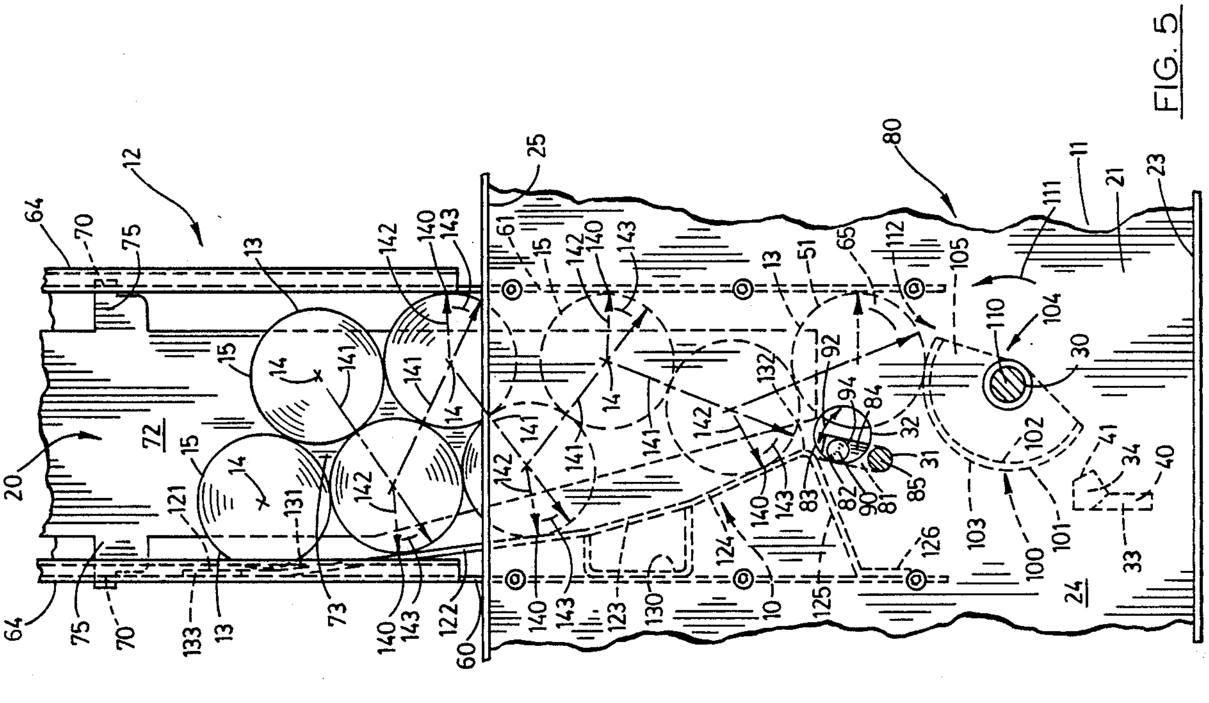
FIG. 4 is a fragmentary, transverse, vertical section also taken on line 2—2 of FIG. 1 showing the operable portions thereof in a third stage of operation in a given cycle.

The dispensing mechanism 80 has a selectively movable gate or blocking shelf 81 which is disposed in close proximity to the lowermost tier 51. The gate 81 has an elongated substantially rectangularly shaped blade 82 which is substantially equal in length to the bucket which will hereinafter be discussed in greater detail. The rectangularly shaped blade defines a longitudinally extending linear blocking edge or distal edge 83. The gate further mounts, at its opposite ends, a pair of brackets or support members 84 which are disposed in a substantially normal attitude with respect to the linear blocking edge. A pair of short shafts operating as pivots 85 and a pair of short posts 90 are individually mounted in predetermined attitudes on each of the brackets. The pair of pivots are operable individually to be rotatably received in the second orifices 31 and the pair of posts are adapted to be received in the third orifices 32. As best shown in FIGS. 3 and 4, the gate 81 is adapted to move along a substantially arcuately shaped path of travel 92 from a blocking or restraining position 93 to a release position 94. In the blocking position, the gate is operable to support the lowermost tier 51 in a fixed position or attitude in the staggered stack column 20, and in the release position the lowermost tier is allowed further to gravitate along the staggered stack column. The path of movement of the gate 81 is defined by the individual posts 90 which travel within the orifices 32.

Figure 1:
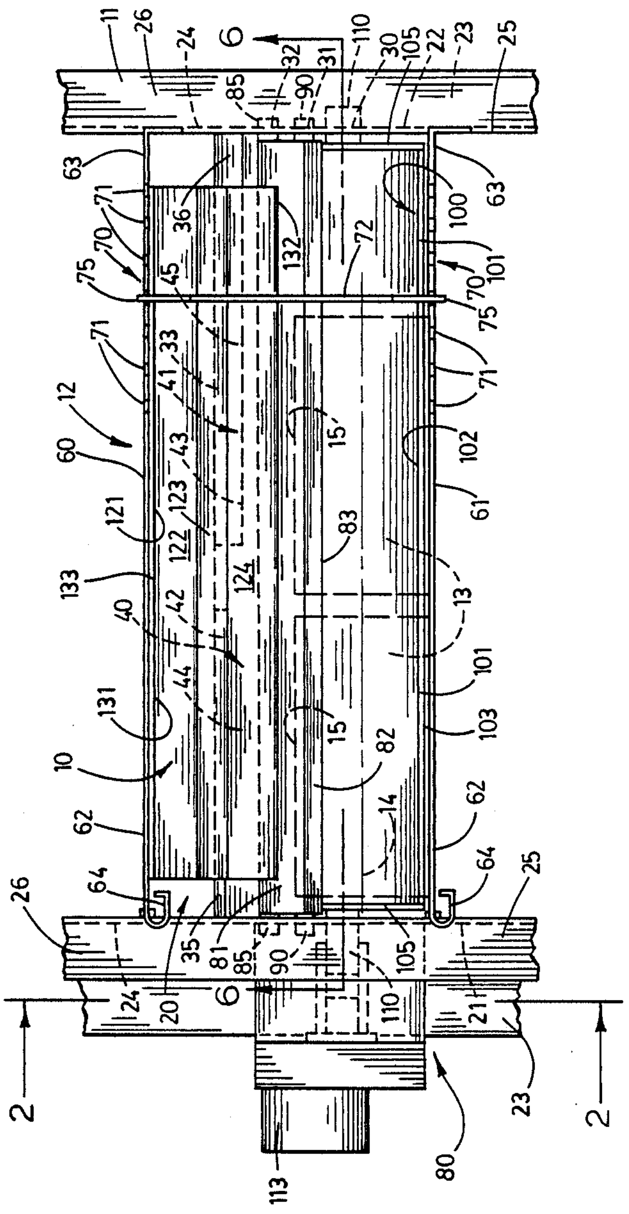
FIG. 1 is a fragmentary top plan view of the ramp apparatus of the present invention shown mounted on, and functional as an operable part of, a staggered stack column of a conventionally vending machine and showing some underlying structures in hidden lines.

The single column dispensing mechanism 80 rotatably mounts a bucket 100, which is preferably of unitary construction. The bucket has an elongated and transversely arcuate shaped plate or side wall 101 which defines a concave inner side or surface 102 and a convex outer side or surface 103. The radius of the concave surface is substantially equal to or greater than the radius of the container of the largest diameter for which the dispensing mechanism 80 is adapted, and the length of the arcuate plate is somewhat less than the distance between the first and second support members 21 and 22 and is thus substantially equal to or greater than the length of the lowermost tier 51. The concave surface further has an open side 104 which generally conforms to the periphery of the two containers 13 in the lowermost tier. The bucket 100 has a pair of end walls 105 which are individually mounted on the opposite ends of the arcuately shaped plate 101. A short post 110 is individually mounted on each end wall 105 and is operable rotatably to be received in the orifices 30 so as to cause the bucket to be mounted for rotational movement along a counterclockwise path of rotation 111. As shown best in FIG. 6, the bucket 100 is positioned beneath the lowermost tier 51, and is disposed in a work station which is generally indicated by the numeral 112. A motor 113 is borne by the vending machine and is mounted in driving relation to the bucket 100. This is best shown in FIG. 1.

A linkage, not shown, interconnects the motor 113, the bucket 100 and the gate 81. The linkage transmits energy from the motor to the gate for motivating the gate in selectively pivotal movement relative to the bucket. The structure and operation of a typical linkage is described in significant detail in U.S. Pat. No. 4,454,961 to Childers et al. and for the sake of brevity is not discussed in significant herein. As earlier discussed the ramp apparatus 10 operates with a variety of different types of single column dispensing mechanisms and the invention hereof is therefore not limited in any way to the dispensing mechanism disclosed in U.S. Pat. No. 4,454,961.

The ramp apparatus 10 is mounted on the first wall 60 and is disposed in close proximity to the single column dispensing mechanism 80. The ramp apparatus 10 has a first supporting surface 121 which is affixed in substantially facing relation on the first wall using welding or other suitable fastening techniques. The ramp apparatus has second, third and fourth supporting surfaces 122, 123, and 124, respectively, which are endwardly interconnected in a serial fashion with the first supporting surface. The ramp apparatus having the first, second, third and fourth supporting surfaces is, of course, preferably, although not necessarily, formed from a single sheet of appropriate gauge metal which is bent along the predetermined courses best shown in FIG. 6 to form the supporting surfaces. The first, second, third and fourth supporting surfaces are individually disposed in predetermined angulated spaced relation to the first wall and in converging relation to the second wall 61. This can best be seen in FIGS. 2 through 5. A support member 125 is mounted on the fourth section and is secured on the first wall 20 as to support the second, third, and fourth supporting surfaces in fixed, spaced relation to the first wall. The support member 125 has a base portion 126 which is affixed by welding or the like on the first wall. Further, a substantially U-shaped ramp support member 130 is mounted the first wall and on the ramp apparatus in back of the third supporting surface to provide further support for the ramp apparatus 10.

The surface thus formed from the supporting surfaces 121, 122, 123 an 124 is articulated thereby converging upon the second wall at a progressively more acute rate in a downward direction as shown in FIGS. 2 through 5.

The ramp apparatus 10 has a first end 131 and a second end 132. The first end of the ramp apparatus has a top edge 133. The top edge 133 has a central apex 134 of relatively short length and opposite sloping shoulder portions 135 extending obliquely, downwardly therefrom, as best shown in FIG. 6. The second end 132, together with the second wall 61, defines a dispensing opening 136.

As best shown in FIG. 6, the angulated profile of the top edge 133 defined by the apex 134 and shoulders 135 operates so that only a small portion of the top edge is in contact with each container as it passes gravitationally by the top edge. It has been discovered that this feature substantially inhibits product bridging. When a pair of containers 13 is disposed in such relative positions one with the other that they are operable to block or inhibit further gravitational movement of other containers along the staggered stack column 20, this is known in the industry as "product bridging." Typically such product bridging occurs in conventional vending machines at the point where the containers are forced to converge into a single column. This is sometimes called a "bridge zone." In the preferred embodiment of the ramp apparatus of the present invention, the angles of the shoulder portions 135 relative to horizontal are approximately five (5) degrees. However, disposition of the shoulder portions at other angles will also operate. In addition, the top edge can have other profiles which avoid contact of the top edge with all of a container passing thereover at anyone time, and/or which cause a container to shift slightly in passage thereover. For example, a curved profile for the top edge also operates effectively. As best shown in FIGS. 2 through 5, the ramp apparatus 10 is operable to cause the plurality of containers 13 to converge into a single column above the next to be dispensed container which is disposed at the lowermost tier 51. The ramp apparatus thus maintains the maximum number of containers 13 possible in the staggered stack column 20 while simultaneously affording the benefits of vending from a single column.

As best shown in FIGS. 2 through 5, the staggered stack column 20 is operable to retain the individual containers 13 in offset relation to each other. In this arrangement the individual containers rest at individual points of contact 140 against either the second wall 61 or the ramp apparatus 10. The contact between each container and the first wall, second wall, or the ramp apparatus is along a line of contact extending along exterior surface 15 of each container substantially parallel to the longitudinal axis 14 of the container. This line of contact for each container when rested against the first wall, second wall or fully on the ramp extends substantially the full length of the container. When passing over the top edge 133 of the first end 131 of the ramp apparatus the line of contact extends only a portion of the length of the container thereby producing the shift in the container to which reference has previously been made.

For illustrative convenience, lines of reference are shown in FIGS. 2 through 5. As shown therein, first lines of reference 141 interconnect the longitudinal axes 14 of certain adjoining containers 13 and extend in a straight line to form the radius of the lower container of the pair. The first lines of reference individually interconnect the longitudinal axes 14 of each adjoining pair of containers composed of an upper container and an offset lower container. A second line of reference 142 interconnects each container's longitudinal axis and the point of contact 140 of that container with the second wall or the ramp apparatus. The first and second lines of reference of a given container define an angle 143.

It has been discovered that to inhibit product bridging and thereby increase the vending machine's 11 reliability, the angle 143 must be maintained at greater than or equal to twenty-eight degrees (28°). As the individual containers travel gravitationally from the first end 131 of the ramp apparatus to the second end 132 of the ramp apparatus, the ramp apparatus is operable to cause the first lines of reference of the pairs of containers to move toward nearly vertical attitudes while simultaneously maintaining the angles 143 at substantially twenty-eight degrees (28°). It has been discovered that a reduction of the angle 143 below twenty-eight degrees (28°) while the containers are in the bridge zone increases the frequency of produce bridging. The second, third and fourth supporting surfaces are operable to cause the containers to merge to form a single column in a minimum of vertical space thereby maximizing the total number of containers that the vending machine can store.

OPERATION

The operation of the described embodiment of the present invention is believed to be readily apparent and is briefly summarized at this point.

Reference has already been made to the operation of the top edge 133 of the first end 131 of the ramp apparatus 10. Because of the configuration thereof, only a relatively small portion of the top edge contacts a container passing thereover at any given time. Therefore, the chance for bridging therefrom is minimized.

As similarly already described, the articulated surface of the ramp apparatus 10 operates to cause the staggered stack column to merge into a single stack column in the shortest possible space while insuring that the angle 143 remains at substantially twenty-eight degrees (28°). These factors coupled with the position of the ramp apparatus immediately adjacent to the dispensing mechanism 80 allows the maximum number of containers to be retained in the column while minimizing the likelihood of product bridging.

The operation of the ramp apparatus 10 during vending is best understood by a study of FIGS. 2 through 5 which show the various stages of operation of the ramp apparatus in a given cycle of operation. As illustrated therein, the ramp apparatus 10 is shown on a staggered stack column 20 and is disposed in gravitationally feeding relation to the single column dispensing mechanism 80. The dispensing mechanism 80, as previously discussed, is operable to dispense containers 13 from a multiple depth stack. The dispensing mechanism typically receives simultaneously from the staggered stack column 20 all of the containers 13 in the lowermost tier 51 and then dispenses the containers individually upon the successive activation of a control system, not shown. Such control systems are well understood by those skilled in the art.

In the vending cycle two containers 13 previously received in the bucket 100 are sequentially dispensed and two containers in the lowermost tier position 51 are subsequently received in the bucket 100 to be dispensed immediately following such cycle. At the initiation of the vending cycle and as best seen by reference to FIG. 1, the gate 81 is disposed in its blocking or restraining position 93, and the rectangularly shaped blade 82 extends toward the lowermost tier 51 and substantially inhibits the lowermost tier from traveling gravitationally through the dispensing opening 134. The gate is operable, therefore, to block downward movement of the containers and is adapted to support the plurality of containers 13 upstream of the bucket 100. Due to the configuration and disposition of the gate, the containers 13 are engaged substantially tangentially by the blocking edge 83, thereby facilitating subsequent pivotal movement of the gate from the blocking position 93 along the path of travel 92 and to the release position 94.

As best shown in FIG. 2, a pair of containers 13, shown in phantom lines, are disposed in the bucket 100. These two containers are the containers previously received from the lowermost tier 51. Upon a first initiation of vending cycle, the vending machine 11 provides a first container vending initiation of the motor 113, and the linkage, not shown, in response to the motor operation motivates the bucket 100 along the path of rotation 111 and into a downwardly disposed discharging disposition shown in FIG. 3. In this position, the individual container 13 which is disposed in the area of the bucket 100 most closely adjacent to the first portion 40 of the discharge control member 33 is allowed gravitationally to escape from the bucket thereby being dispensed by the vending machine. As a result of this first initiation of the vending cycle only one container 13 is released from the bucket. The second container in the bucket is restrained by the blocking action of the second portion 41 of the discharge control member therein.

As best shown in FIG. 3, upon a second initiation of the vending cycle by the control system, the motor 113 is operable to rotate the bucket 100 further along the path of rotation. This permits the second or remaining container in the bucket gravitationally to escape from the bucket and thereby be dispensed by the vending machine. This second initiation of the vending cycle is also operable to cause the linkage to urge the gate 81 into its release position 94. The gate is spaced horizontally from the containers 13 in the lowermost tier 51. As a result, these containers are free to gravitate into the work station 112 and onto the convex outer bucket surface 103. As the bucket continues to rotate along the path of travel 111, the linkage is operable to cause the gate to return to the blocking position 93. The containers resting on the outer surface 103 slowly drop into the bucket as the open side 104 becomes positioned in an upwardly disposed direction. This movement of the containers into the bucket is facilitated by the distal end 65 of the second wall which defines a substantially planar surface upon which the containers easily slide. This is illustrated most clearly by reference to FIG. 5.

The ramp apparatus 10 substantially inhibits adjoining containers from bridging and simultaneously permits the plurality of containers to converge in a minimum distance by maintaining the angle 143 at substantially twenty-eight degrees (28°). A related factor in achieving the objectives of the present invention is that the slope of the first line of reference 141 becomes increasingly oriented in a more nearly vertical attitude as the containers move, under the influence of gravity, along the ramp apparatus and into feeding relation with the dispensing mechanism 80. By achieving these effects, the ramp apparatus is operable to cause the containers to be merged into a next-to-be dispensed product row or lowermost tier 51. This allows a staggered stack column to employ the same dispensing mechanism 80 as that utilized with a single column and thus eliminates the need for utilizing product dispensing mechanisms which are peculiarly designed for staggered stack columns. Further, the use of a single column dispensing mechanism for both single, and staggered stack columns greatly reduces the total number of different components utilized in vending machines so equipped and thereby reduces the costs related to manufacture and maintenance of such dispensing mechanisms.

Therefore, it will be seen that the ramp apparatus 10 of the present invention provides a fully dependable and practical means by which a plurality of containers disposed in a staggered stack column can be dispensed by a conventionally designed single column dispensing mechanism, operates substantially to prevent product bridging, reduces the cost of manufacturing vending machines by reducing the number of assorted vending mechanisms incorporated therein and is of both sturdy and dependable construction.

Although the invention has been herein shown and described in what is conceived to be the most practical and preferred embodiment, it is recognized that departures may be made therefrom within the scope of the invention which is not to be limited to the illustrative details disclosed.

Having described my invention, what I claim as new and desire to secure by Letters Patent is:

1. In a vending machine for dispensing containers, the containers having a substantially common diametral dimension and outer surfaces individually substantially concentric to their respective longitudinal axes, and the vending machine having at least one staggered stack column of said containers defined by first and second walls borne by the vending machine and disposed in spaced relation to each other and operable gravitationally to channel the staggered stack column of containers toward a dispensing position and a dispensing mechanism operable successively to dispense the containers during vending, a ramp apparatus comprising a ramp mounted on the first wall in close proximity to said dispensing mechanism and having a sloped surface convergent in a downward direction toward the second wall to define a dispensing opening which has a dimension greater than said diametral dimension, and said ramp having an upper edge so configured that contact between said upper edge and the outer surface of each container passing thereover is substantially only along a line of contact on said outer surface of the container substantially parallel to said longitudinal axis of the container and is sufficiently less than the length of the container to promote shifting of the containers so as to inhibit bridging of said containers whereby said staggered stack column is caused to converge to form a single stack column in close proximity to the dispensing mechanism so that a maximum number of containers can be housed in said staggered stack column and a single column dispensing mechanism can be employed.

2. The ramp apparatus of claim 1 wherein said second wall of the vending machine has a distal end portion defining a substantially planar surface which is substantially vertical and substantially without curvature.

3. The ramp apparatus of claim 1 wherein said upper edge of the ramp has a shoulder portion extending obliquely along said first wall so as to be contacted by each container passing thereover at an angle.

4. The ramp apparatus of claim 1 wherein said sloped surface of the ramp is composed of segments disposed at progressively greater angles to the second wall in a downward direction.

5. The ramp apparatus of claim 1 wherein the second wall of the vending machine is mounted in said vending machine in fixed position.

6. The ramp apparatus of claim 1 wherein adjoining pairs of containers in said column are disposed in offset relation to each other so as in said pair to have an upper container and a lower container which rest against each other and which individually rest against the second wall or the ramp during said convergence into a single column stack and wherein the longitudinal axes of the containers of each said pair can be viewed as interconnected by a first straight line of reference extending at right angles to said longitudinal axes and to said outer surfaces of the containers and second straight lines of reference individually interconnecting the longitudinal axes of the containers of said pair and the points of contact of the individual containers with said sloped surface of the ramp and said sloped surface of the ramp is so configured that said first and second lines of reference of said pair define an angle which is substantially twenty-eight degrees during said convergence.

7. In a vending machine for selectively dispensing substantially cylindrically shaped containers, each of said containers having a main body with a surface substantially concentric to a longitudinal axis, and having at least one staggered stack column of said containers defined by first and second walls borne by the machine and disposed in spaced relation to each other and operable gravitationally to channel the staggered stack column of containers toward a dispensing position and a dispensing mechanism operable successively to dispense the containers from the staggered stack column during vending, a ramp apparatus comprising:

a ramp mounted on the first wall in close proximity to the dispensing mechanism and having a sloped surface in convergent relation to the second wall in a downward direction operable to cause the staggered stack column to converge to form a single stack column in a minimum of vertical distance for subsequent vending by the dispensing mechanism while simultaneously maintaining the maximum number of containers possible in the staggered stack column and wherein the main bodies of adjoining pairs of containers in said column are disposed in offset relation to each other so as in said pair of containers to have an upper container and a lower container which rest against each other and which individually rest against the second wall or the ramp during said convergence into a single column stack, and wherein said longitudinal axes of the main bodies of the containers of each said pair can be viewed as interconnected by a first straight line of reference extending at right angles to said longitudinal axes and to the surfaces of said main bodies and second straight lines of reference individually interconnecting the longitudinal axes of the main bodies of the containers of said pair and the points of contact of the individual containers with said sloped surface of the ramp and said sloped surface of the ramp is so configured that said first and second lines of reference of said pair define an angle which is substantially twenty-eight degrees during said convergence.

8. The apparatus of claim 7 wherein the ramp has a top edge of predetermined shape such that only a small portion thereof comes into contact with the individual containers as they pass thereby so as to inhibit bridging of the upper and lower containers of said pair.

9. The apparatus of claim 8 wherein the ramp has a plurality of interconnected surfaces which are individually disposed in predetermined angulated spaced relation to the first wall and in individual converging relation to the second wall.

10. The apparatus of claim 9 wherein said surfaces of the ramp are so related as to cause the first lines of reference of said pairs of containers to be positioned in more nearly vertical attitudes as the pairs of containers gravitationally move therealong.

11. The apparatus of claim 10 wherein the individual containers have a common predetermined diametral dimension and the ramp and the second wall define a dispensing opening which has a dimension greater than said diametral dimension of the individual containers, and the second wall has a distal end portion defining a substantially planar surface which is disposed in close proximity to the dispensing mechanism so that individual containers slide along said planar surface during the vending operation.

* * * * *

UNITED STATES PATENT AND TRADEMARK OFFICE
CERTIFICATE OF CORRECTION

PATENT NO. : 4,940,161

DATED : 7/10/90

INVENTOR(S) : Larry E. Hieb

It is certified that error appears in the above-identified patent and that said Letters Patent is hereby corrected as shown below:

Column 3, Line 62

Delete "effectivelY" and insert ---effectively---

Column 4, Line 32

Delete "1"

Column 5, Line 17

Insert ---with a flange member 26 individually affixed thereon and--- before the word extending.

Column 5, Line 54

Delete "-" after the word of

Signed and Sealed this

Thirteenth Day of August, 1991

Attest:

HARRY F. MANBECK, JR.

Attesting Officer

Commissioner of Patents and Trademarks